May 26, 1959  J. F. CONTE ET AL  2,887,827
APPARATUS FOR FILING TEMPLATES AND THE LIKE
Filed Sept. 30, 1957  11 Sheets-Sheet 6

May 26, 1959    J. F. CONTE ET AL    2,887,827
APPARATUS FOR FILING TEMPLATES AND THE LIKE
Filed Sept. 30, 1957    11 Sheets-Sheet 7

United States Patent Office 2,887,827
Patented May 26, 1959

2,887,827

APPARATUS FOR FILING TEMPLATES AND THE LIKE

Joseph F. Conte and Edward C. Polidor, Rochester, N.Y., assignors to Optical Gaging Products, Inc., Rochester, N.Y., a corporation of New York Application September 30, 1957, Serial No. 687,108

19 Claims. (Cl. 51—59)

This invention relates to a machine for performing filing, honing, scribing, and similar operations upon templates or like work pieces.

An object of the invention is the provision of generally improved and more satisfactory apparatus of this kind.

Another object is the provision of a particularly simple and efficient machine for filing templates or the like to an outline or configuration determined by a master pattern.

Still another object is the provision of a machine having means for optically projecting a magnified image of a work piece being operated upon (e.g., a template being filed or honed) and a correspondingly magnified image of a master pattern onto a viewing screen in superimposed relation to each other, and in such manner that as the filing or honing operation proceeds, the magnified outline of the template with relation to the magnified outline of the pattern may be constantly observed by the operator, so that the filing or honing operation may be performed with great accuracy.

A further object is the provision of improved and simplified adjusting means for focusing the respective images of the pattern and the template on the viewing screen; and improved and simplified mounting mechanism for mounting the template and transporting it past the filing or honing tool operating upon the template but remaining in a fixed position; and improved and simplified means for controlling, observing, and adjusting various parts of the apparatus or mechanism.

These and other desirable objects may be attained in the manner disclosed as an illustrative embodiment of the invention in the following description and in the accompanying drawings forming a part hereof, in which.

The same reference numerals throughout the several views indicate the same parts.

To give first a very brief outline of the general features of a preferred embodiment of the present invention, in order to enable quicker understanding of the detailed description of the various parts, a stationary table or support 31 (Figs. 1 and 2) is supported by suitable legs or pedestals 33. Movable horizontally from right to left on the stationary table 31 is a first movable table 35, which in turn carries a second table 37 movable horizontally from front to rear, constituting in effect what may be called a compound slide or table. Near its center this table 37 carries a vertical pivot on which is rotatably mounted a rotary table 39, rotating through a limited extent in a horizontal plane.

The rotary table 39 carries the template or other work piece to be filed or honed, and also carries a bridge member 41 fixed to the rotary table 39 at its ends, and having a central portion at a considerable elevation above the work surface of the table 39. The bridge member 41 carries the master pattern, outline, or chart (sometimes called a reticle) showing the correct shape to which the work piece is to be finished, this pattern being arranged horizontally on the upper part of the bridge, directly over the work piece which is on the table 39 beneath the bridge. Since the master pattern is fixed to the bridge 41 and since the bridge in turn is fixed to the rotary table 39 to which the work piece is also fixed, the master pattern partakes of any movement which is imparted to the work piece, either by moving the table 35 in a lateral direction sideways of the machine, or by moving the table 37 frontwardly or backwardly, or by turning the rotary table 39 on its pivot. An optical system projects an enlarged or magnified image of the work piece and a similarly enlarged or magnified image of the master pattern onto a viewing screen 45 arranged in an upstanding position conveniently observable by the operator of the machine, at the front of an upward extension or housing 47 rising from the rear portion of the stationary base of the machine. Thus by observing the magnified images of the work piece and the pattern on the viewing screen 45, the operator is easily able to see just how far the filing or honing of the edge of the work piece is progressing, with relation to the theoretical shape which it is desired to impart to the work piece.

Proceeding now to a description of more detailed features, and referring particularly to Figs. 14–17, as well as the previously mentioned general views (Figs. 1 and 2), the stationary table 31 is provided near its front edge with a laterally extending V-groove 51 receiving a series of short rollers 53 with their axes inclined at 45 degrees, alternate rollers having their axes inclined in alternate directions. These rollers engage in an inverted V-groove 55 of the table 35, to form a guide permitting lateral movement of the table 35 along a straight line, but preventing movement in a direction from front to back of the machine. A cage bar 57 extends horizontally along the guideway, with openings to receive individual rollers in order to keep them properly spaced from each other during the travel of the table 35 back and forth.

Figure 4:
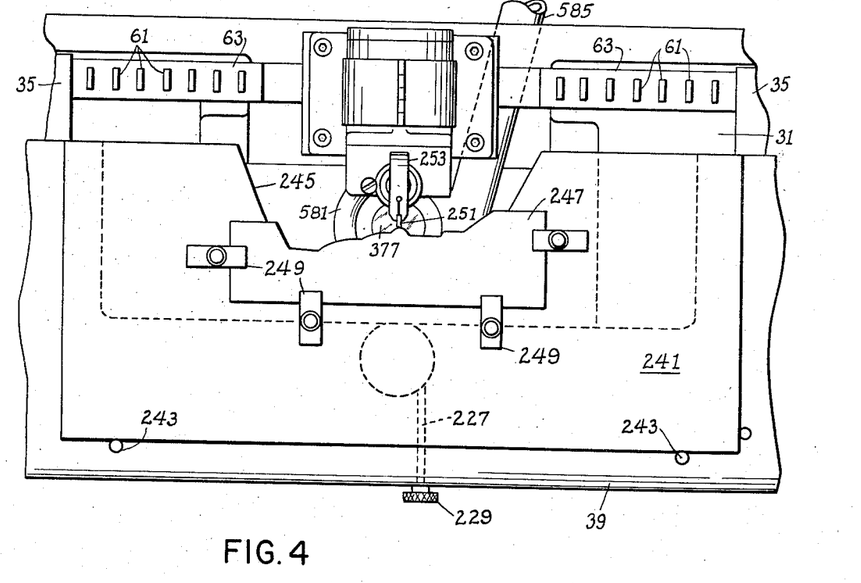
Fig. 4 is a fragmentary plan of the template being operated upon, the file holder, the vacuum ring, and fragments of the tables and supports.

This roller arrangement supports the front edge of the first table 35. The rear edge thereof is supported on a series of cylindrical horizontal rollers 61 (Figs. 2 and 4) rolling on a horizontal surface near the back edge of the stationary table 31, and engaging a horizontal surface on the table 35, and having a suitable cage bar 63 to keep the rollers properly spaced from each other. The rear rollers 61 serve merely a supporting function without a horizontal guiding function, since guiding or alignment in a horizontal direction is accomplished entirely by the V-grooves 51 and 55 and the cooperating rollers 53.

For moving the table 35 right or left along its guideway, there is both manual and power means usable alternatively as desired. A feed screw or lead screw 65 extends in the direction of travel of the table 35 and is mounted in ball bearings 66 on a stationary bracket 67 (Fig. 16) at the right hand end of the screw 65, and 68, on a stationary gear box 69 (Fig. 15) at the left hand end of the gear box, both members 67 and 69 being fastened to the stationary table or support 31. A nut 71 (Fig. 16) travels along the screw 65 as the latter is turned, an upward projection at the top of the nut making a tight sliding fit between two cross pieces 73 on the bottom of a longitudinal bar 75 of rectangular cross-section fixed to the underside of the table 35. Thus any horizontal motion of the nut 71 in the direction of the axis of the screw 65 is transferred to the bar 75, and from this bar to the table 35. But if any part of the screw 65 happens to be slightly out of true, or slightly non-parallel to the direction of the guideway 51, 53, 55, the nut 71 may move to a limited extent in a floating manner in the space between the cross members 73.

The left end of the screw 65 is connected to a short shaft 81 (Fig. 15) axially aligned with the screw 65 and mounted in the bearings 68 and 82 in the gear box 69. Keyed to it is a helical gear 83 meshing with another helical gear 85 on the cross shaft 87 which extends out the front of the stationary table or support and is provided with an accessible hand wheel 89 for turning the shaft 87 and thereby, through the gears 85 and 83, turning the shaft 81 and the feed screw 65 of the table 35.

Figure 1:
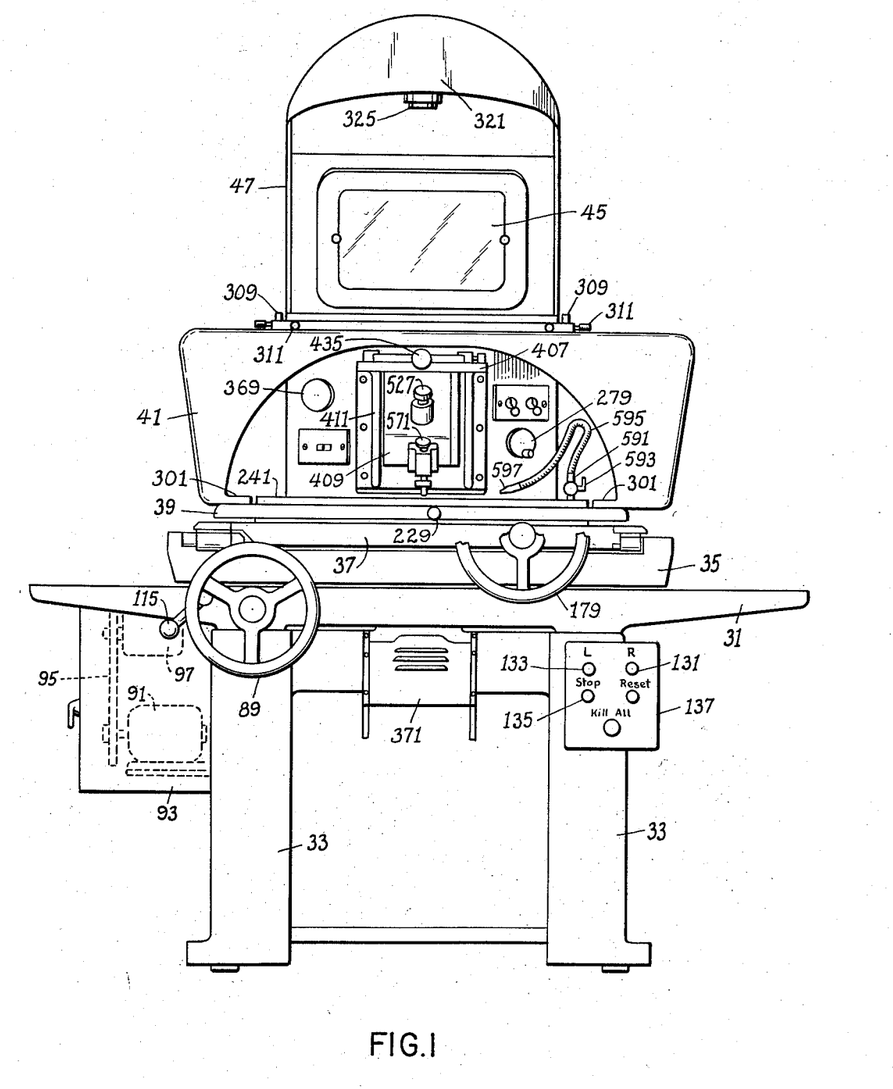
Fig. 1 is a front elevation of a preferred embodiment of apparatus according to the present invention.
Figure 2:
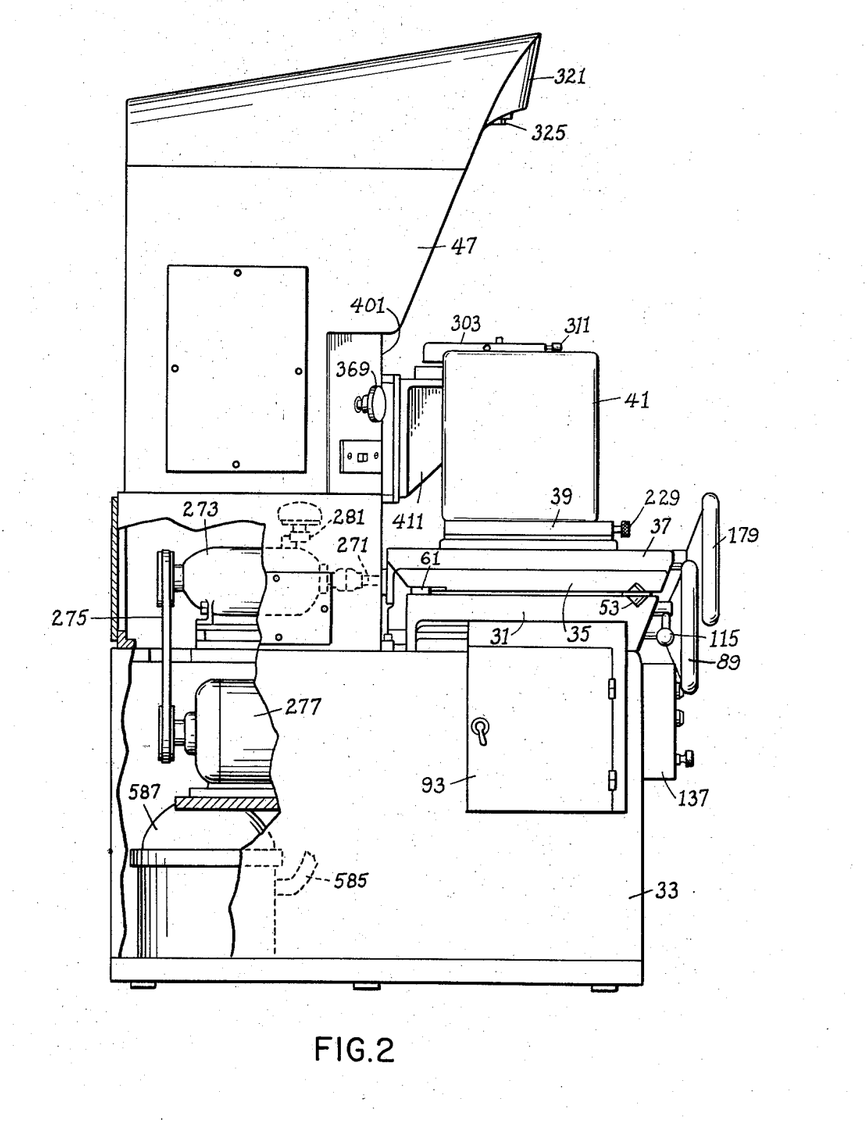
Fig. 2 is a side elevation thereof, viewed from the left side of Fig. 1, with parts broken away and parts in vertical section.

The feed screw 65 may be turned by power means, from a reversible electric motor 91 (Fig. 1) mounted in a motor box 93 secured to the left side of the left pedestal 33. Through a belt 95, the motor drives a reducing gear indicated in general at 97, the driven or slow motion shaft 99 of which (Fig. 15) has a sprocket 101 driving, through a chain 103, a sprocket 105 on a sleeve 107 rotatable on the previously mentioned shaft 81. A clutch element 109 is non-rotatably connected to the shaft 81 but longitudinally slidable thereon, and carries clutch teeth at its right hand end, meshing when desired with corresponding clutch teeth at the left end of the sleeve 107. A clutch shifter fork 111 is secured to a shifter shaft 113 (Fig. 15) which extends forwardly out the front of the stationary table 31 and is provided with a shifting handle 115 (Fig. 1).

To prevent the table 35 from being driven by the motor beyond its proper range of travel, the bar 75 has a pin 117 (Fig. 16) extending forwardly from the front face of the bar in appropriate location to contact with the switch arm 119 of a limit switch 121 in the motor circuit, when the table reaches the limit of motion in a leftward direction. A similar pin 123 projecting rearwardly from the rear face of the bar 75 similarly operates a switch arm 125 of a second limit switch 127 to stop the motor when the table reaches its rightward limit of motion. As already mentioned the motor 91 is a reversing motor, and is operated in the required direction by pressing on a switch button 131 (Fig. 1) to drive the motor in the direction to feed the table to the right, and a switch button 133 to drive the motor to feed the table to the left, the motor being stopped at any desired point by pressing on the stop button 135. These buttons are arranged on a control box 137 located at any point convenient to the reach of the operator, such as on the front of the right hand pedestal 33.

The second table 37, movable forwardly and backwardly in a direction at right angles to the travel of the table 35, is supported from the latter for travel on suitable guideways, insuring accurate alinement. For example, the right hand end of the table may have a hardened rail 141 resting on the tops of a series of horizontally arranged cylindrical rollers 143 rolling on a flat surface of the hardened rail 145 at the right hand end of the table 35. To prevent the table 37 from being raised above its intended plane, a lower rail 147 is provided on the table below the rail 145 on the table 35, and a second set of horizontally arranged cylindrical rollers 149 lies between the rails 145 and 147. Suitable cage bars to maintain spacing of the rollers 143 and 149 are provided.

This arrangement at the right hand end of the second table 37 holds the table in alinement in a vertical direction, but does not provide for the horizontal alinement thereof. The horizontal alinement or guiding of the table 37 is accomplished by the guide means at the left hand end of the table, seen in Fig. 15. On the lower side of the table 37 is a hardened rail 151 extending from front to back and having V-grooves 153 in both of its vertical faces. In these V-grooves are hardened bearing balls, those in the left hand groove 153 being indicated at 155 and engaging in a V-groove 157 of a rail member 159 secured to the table 35, while the balls 161 in the V-grooves at the right hand edge of the rail 153 roll against a plane vertical face of a hardened rail 163 fixed to the table 35. Cage bars 165 and 167 are provided for the respective sets of bearing balls 155 and 161. The left hand rail 159 is adjustable relative to the table 35, and may be tightened up in a horizontal direction toward the rail 151 to eliminate all play in the guideway and to stress the bearing balls to any desired extent, by tightening adjusting screws 171 which bear against the left face of the rail 159 at intervals along its length. After these are screwed up to the desired tension, the holding screws 173 are tightened.

By this arrangement, the table 37 is very accurately guided in exactly the desired direction on the table 35. Its feeding motion (in a direction from front to rear of the machine, or vice versa) may be accomplished, if desired, by power means similar to that already described in connection with the table 35. In most cases, however, it is preferred to operate the table 37 merely by a hand feed, without a power feed. For this purpose, the front edge of the table 35 is provided with an upwardly extending bracket 175 (Fig. 14) which furnishes a bearing for the screw shaft 177 carrying a hand wheel 179. The shaft 177 extends in the direction of travel of the table 37, and is screw threaded to operate on a nut 181 connected to the table.

Stop pins 185 (Figs. 15 and 16) fixed to the table 35 engage the table 37 at the front and rear limits of its motion, to prevent it from running off its tracks by excessive turning of the hand wheel 179.

Figure 16:
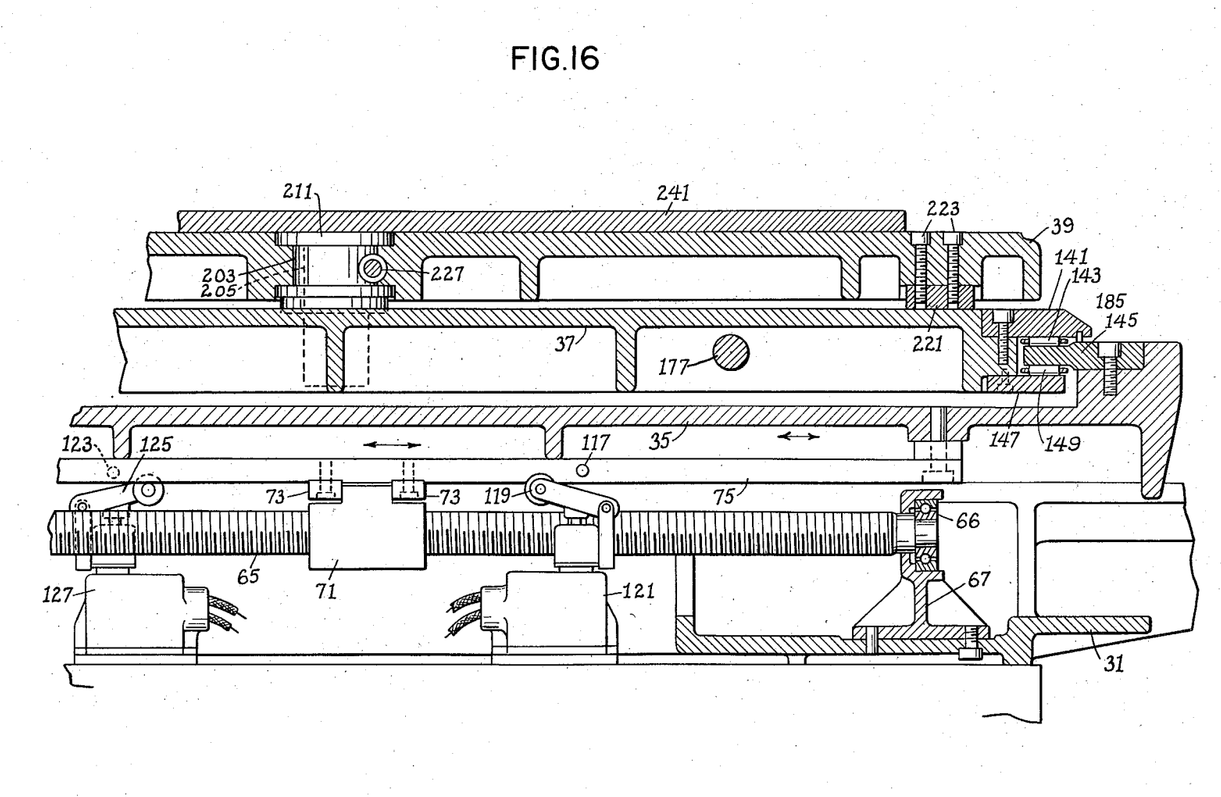
Fig. 16 is a view similar to Fig. 15 showing the parts further to the right, Fig. 16 being in effect a rightward continuation of Fig. 15.
Figure 17:
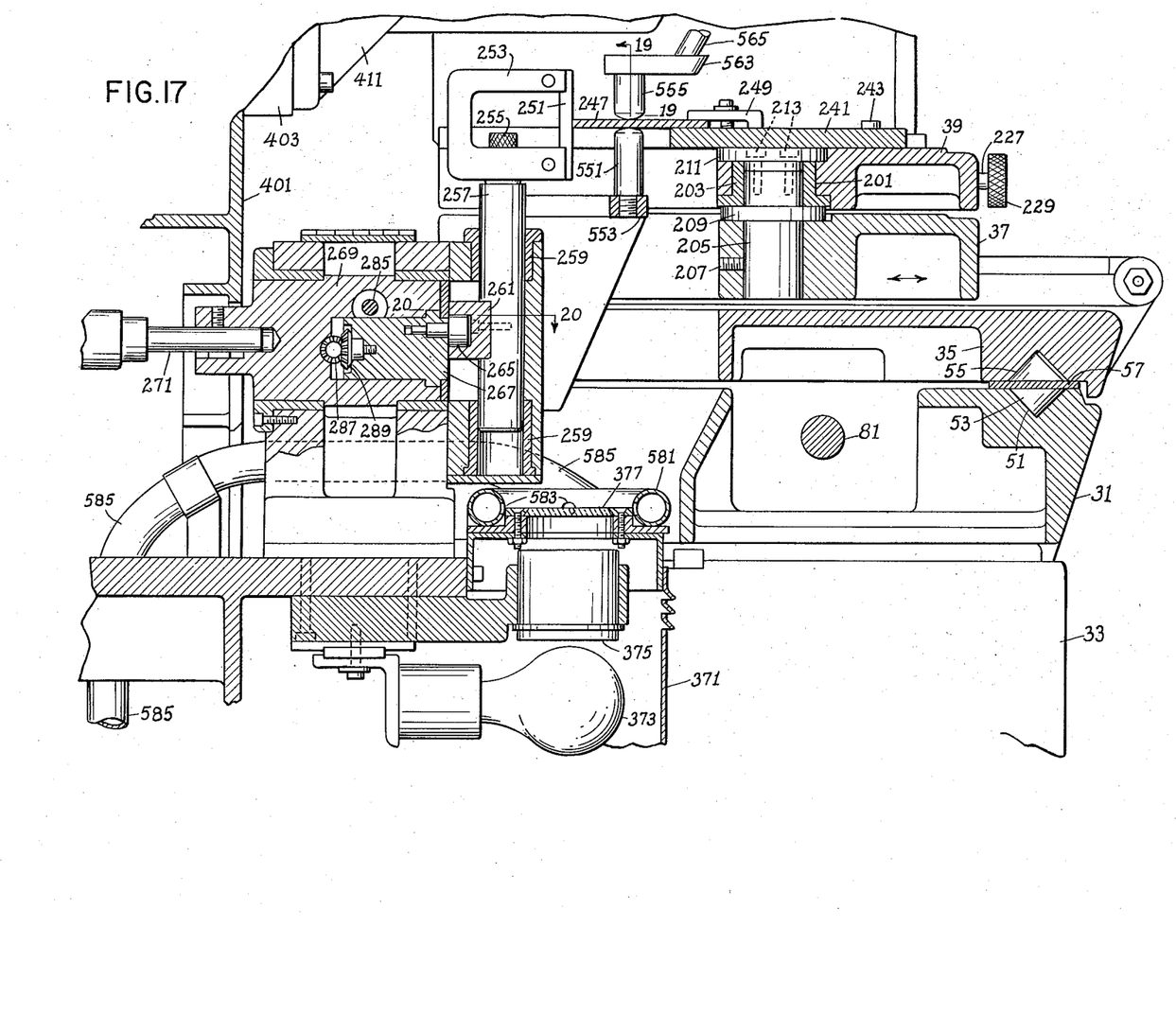
Fig. 17 is a fragmentary vertical section taken approximately centrally through the machine from front to back, illustrating particularly the drive mechanism for the file holder, the vacuum ring for removing chips or filings, and the vertical pivot for the horizontally rotating work table.
Figure 18:
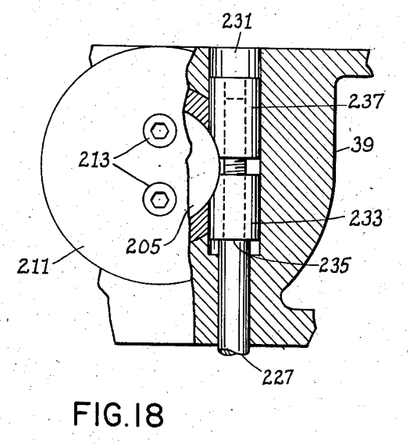
Fig. 18 is a view partly in plan and partly in horizontal section of the pivot for the rotating work table, showing particularly the locking means thereof.

The mounting of the rotary table 39 on the table 37 is best illustrated in Figs. 16, 17, and 18. At its center in a direction from right to left, but not necessarily its center in a direction from front to back, the table 39 has a vertical bore 201 which tightly receives a bearing sleeve 203 fitting snugly but rotatably on the upper end of a vertical pin 205 set in a vertical bore in the table 37 and held immovably therein by a setscrew 207. A circumferential flange 209 formed on the pin 205 intermediate its length rests firmly on a shoulder on the table 37, and the lower end of the bearing sleeve 203 in turn rests on the top surface of the flange 209, the bearing sleeve 203 having a radial lip or flange which underlies a part of the table 39, thus providing a good bearing to support the weight of the table. A cap plate 211 secured to the pivot pin 205 by screws 213 overlies part of the table 39 and prevents upward movement thereof. The table 39 is also steadied and the weight thereof partially supported by bearing shoes or skids 221 (Fig. 16) secured to the underside of the table 39 near each end thereof by screws 223, and bearing upon the flat upper face of the table 37.

To lock the table 39 in any desired position of orientation relative to the table 37, clamping means is provided in connection with the central pivot 205. As best seen in Fig. 18, a bore formed horizontally in the table 39, extending in a direction from front to rear and offset slightly to the right of the axis of the pivot pin 205, receives a shaft 227 which projects forwardly beyond the front edge of the table 39 and has an accessible knob 229. The rear end of the bore which receives this shaft 227 is enlarged or counterbored as at 231 and receives a wedging or clamping collar 233 which is loose on a reduced diameter portion of the shaft 227, the forward end of the sleeve 233 abutting against a shoulder 235 on the shaft 227. Rearwardly of the clamping sleeve 233, there is a second clamping sleeve 237 internally threaded to travel on external screw threads on the shaft 227. The two collars 233 and 237 have arcuately formed portions to engage with the smooth periphery of the pivot member 205 to produce a firm and strong clamping action thereon. When the shaft 227 and knob 229 are turned in a tightening direction, the screw threads will draw the clamping member 237 forwardly and the shoulder 235 will push the clamping member 233 rearwardly, so that the two clamping members both exert a powerful wedging action on the periphery of the pivot member 205, preventing the table 39 from turning.

The rotary work table 39 carries a template adapter plate 241 (Figs. 4 and 16) certain edges of which may contact with locating pins 243 fixed to the table 39, to enable the adapter plate 241 to be quickly reset to its normal position on the table 39 after it has been removed therefrom. The adapter plate 241 has its rear edge centrally notched as at 245. The template or other work piece to be operated upon, indicated at 247, is clamped to the adapter plate 241 by means of various clamps 249, in such position that the edge of the work piece which is to be operated upon by the file or hone lies over the notch 245, in position to be engaged by the vertically reciprocating tool 251 (e.g., a file, a piece of honing abrasive, or the like) mounted on the U-shaped yoke 253 (Fig. 17) detachably secured by a clamping screw 255 in any desired position of orientation on the upper end of the vertically reciprocating plunger 257 mounted for vertical movement in fixed guideways 259 on the stationary frame of the machine.

Figure 20:
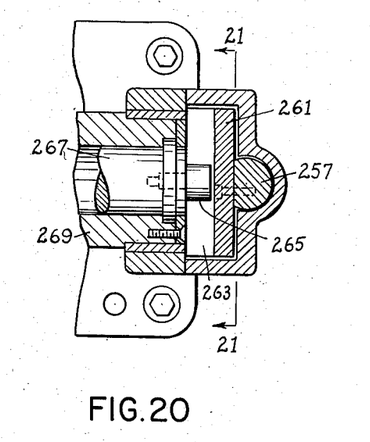
Fig. 20 is a fragmentary horizontal section taken approximately on the line 20—20 of Fig. 17.
Figure 21:
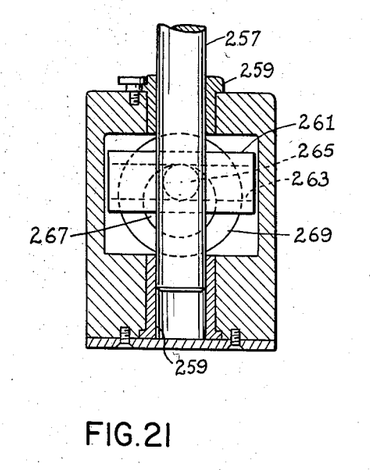
Fig. 21 is a vertical section taken approximately on the line 21—21 of Fig. 20.

To reciprocate this plunger 257, the plunger has fixed to it a cross piece 261 (Figs. 17, 20, and 21) having on its rear face a horizontal slot 263 receiving a crank pin 265 projecting forwardly from and mounted eccentrically with respect to a hub 267 eccentrically mounted within the rotary member 269 coaxial with and driven by a shaft 271 of a variable speed drive unit 273 (Fig. 2) driven by a belt 275 from the motor 277. An accessible adjusting knob 279 (Fig. 1) at the front of the machine is connected in any suitable manner, such as by a flexible shaft or by geared shafting, to the control member 281 (Fig. 2) which controls the output speed of the variable speed drive 273, to control the speed of reciprocation of the plunger 257, tool yoke 253, and file or other tool 251.

The throw or stroke of the tool may also be adjusted, but not while the machine is in motion. In the rotary member 269 there is a wedging clamp device indicated in general at 285 (Fig. 17) having two parts which, when drawn together by screw threads, wedge tightly against the periphery of the hub member 267 (in the same manner as the wedging members 233 and 237 in Fig. 18) and prevent the hub member 267 from turning relative to the rotary member 269. When the clamp 285 is loosened, however, the hub member 267 may be turned by means of a bevel gear 287 having its axis transverse to the rotary axis of the member 269 and having an accessible socket to which a wrench may be applied when the machine is not running, this bevel gear 287 meshing with another bevel gear 289 fixed to the hub 267 concentrically therewith, so that the turning of the bevel gear 287 turns the hub 267 in its bore or socket in the rotary member 269, thus varying the eccentricity of the crank pin 265 with relation to the rotary axis of the member 269.

From the description up to this point, it will be seen that when the file or other tool 251 is reciprocated upwardly and downwardly by operation of the motor 277, the rear edge of the template or other work piece 247 is presented to the effective edge or surface of the tool 251, and is filed or otherwise suitably operated upon by the tool. Since the template or work piece 247 is mounted on the rotary table 39 which, in turn, is mounted on the table 37 capable of forward and backward movement toward and away from the tool 251, and since this table 37 is in turn mounted on the laterally movable table 35 movable leftwardly and rightwardly relative to the tool 251, various parts of the template or work piece may be brought against the tool.

Figure 3:
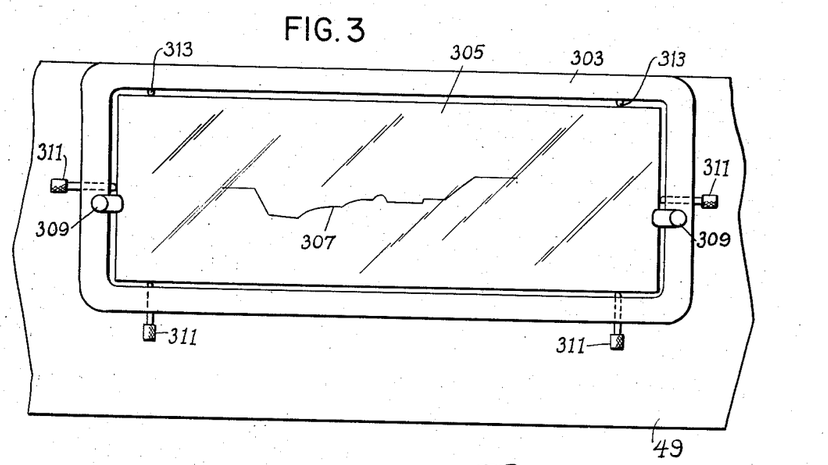
Fig. 3 is a plan of the pattern or master outline mounted on top of the rotary table with parts of the latter broken away.

The previously mentioned bridge structure indicated in general at 41 (Figs. 1 and 2) has downwardly extending ends which rest on and are secured to the ends of the rotary table 39, as seen at 301 (Fig. 1) and has a flat top surface 49 to which is secured a rectangular rim 303 (Fig. 3) within which is received the master pattern 305 showing the shape to which the template is to be formed. This master pattern may be made in various ways, but preferably is inscribed on a sheet of glass, and may be called also a reticle. On the master pattern or reticle 305 shown in Fig. 3, the lines 307 represent a typical form or shape to which the template is to be made.

The flat top surface of the bridge structure 49 is cut away within the outline of the rim 303, except for a ledge or flange around the periphery of the rim, on which the edges of the master pattern may rest. The pattern is clamped down on such ledge or flange by the clamps 309, and may be adjusted slightly in a horizontal direction by adjusting screws 311 bearing edgewise against the edges of the pattern 305 at suitable points, opposite spring pressed plungers 313 at the opposite edge.

Rising from the stationary rear part of the machine behind the tables 35, 37, and 39, and behind the bridge 41, is the previously mentioned upwardly extending portion 47 of the casing, carrying the optical viewing screen 45. This part of the casing is dust-tight and light-tight. Above the viewing screen 45, the casing extends further upwardly and forwardly to a peak 321 containing illuminating means such as the electric lamp 323 (Fig. 5) located vertically directly above the file or other operating tool 251. A collimating or condensing lens in the lens mount 325 (Figs. 1 and 2) directs a collimated beam of light vertically downwardly onto whatever small area of the master pattern or reticle 305 happens to be directly under the lamp 323 and lens system 325 at the moment. Of course as the tables 35, 37, and 39 are moved, different portions of the master pattern or reticle 305 are brought into the beam of light.

Figures 5, 6:
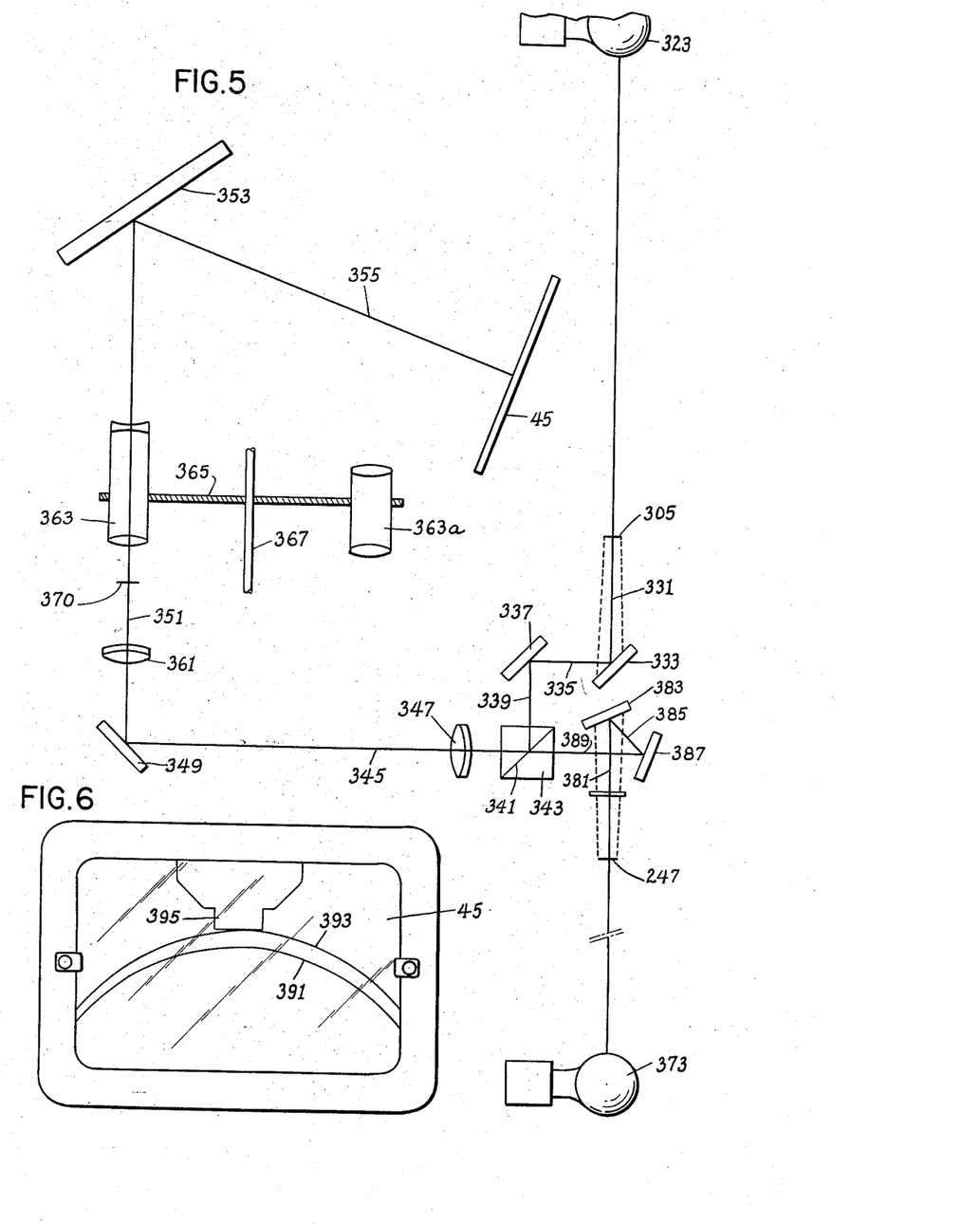
Fig. 5 is a schematic diagram of the optical system.
Fig. 6 is a face view of the viewing screen showing a typical outline of the template and the file operating thereon as seen in the viewing screen.
Figure 7:
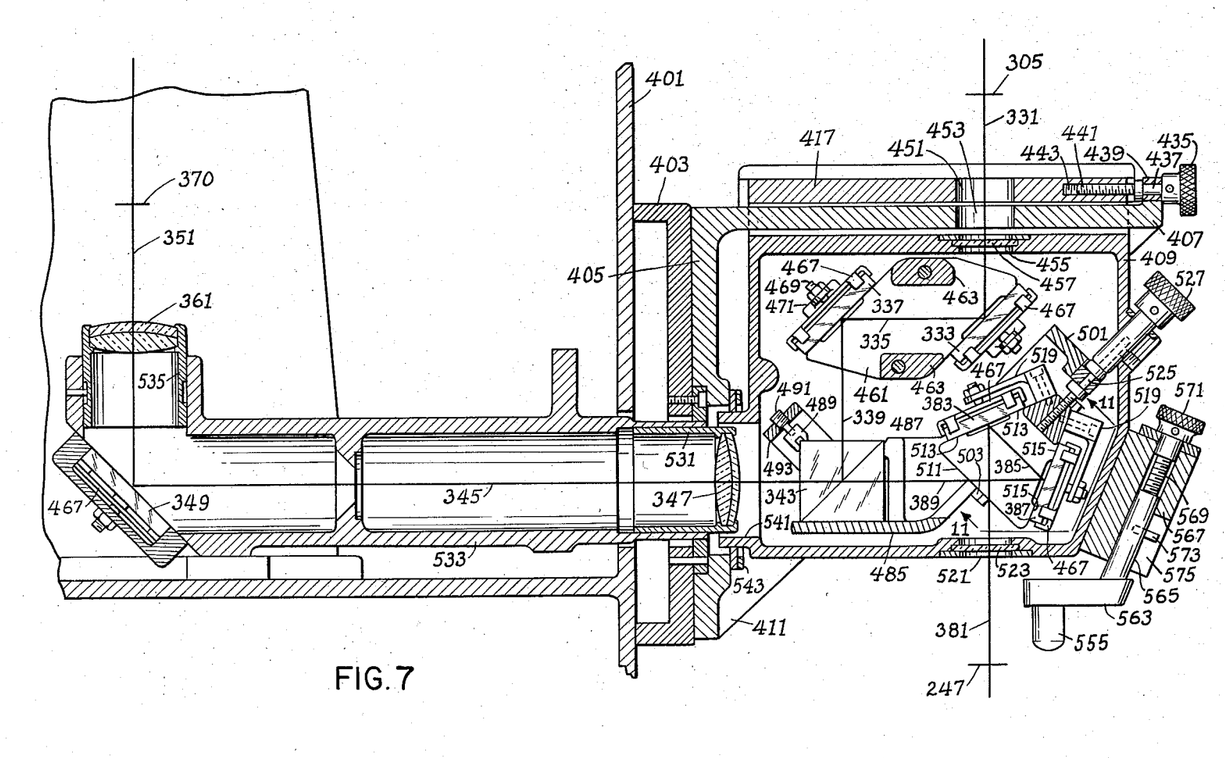
Fig. 7 is an axial section taken through a portion of the optical system, illustrating certain mechanical details thereof.
Figure 8:
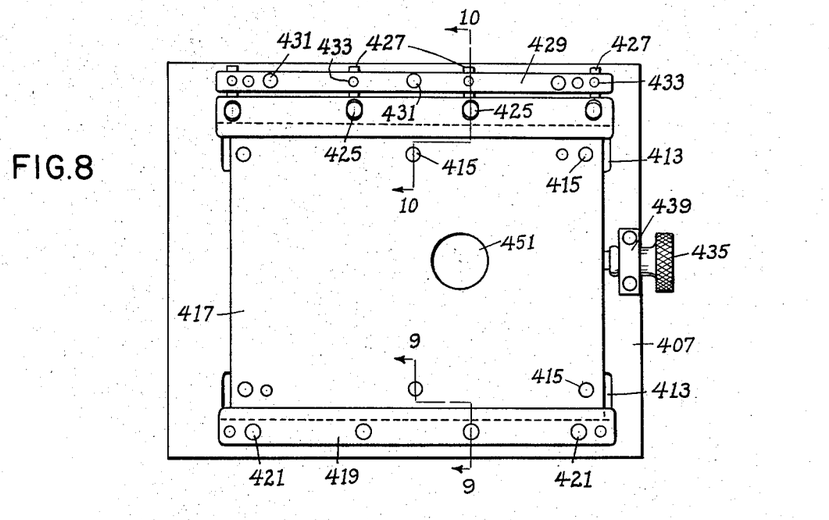
Fig. 8 is a top plan view of the mechanism shown at the right hand portion of Fig. 7.

An optical system indicated somewhat diagrammatically or schematically in Fig. 5, and partly shown in mechanical detail in Fig. 7 and elsewhere, projects an enlarged or magnified image of the illuminated part of the master pattern 305 onto the viewing screen 45. Referring now to Fig. 5, the beam of light from the illuminated area of the master pattern 305 passes downwardly along the line 331, is reflected rearwardly by the mirror 333 to pass along the path 335 to a second mirror 337, from which the beam is reflected downwardly at 339 to the interface 341 of a beam splitter prism assembly 343, being reflected rearwardly from this interface along the line 345, passing through the lens 347 en route to another mirror 349, which mirror reflects the beam upwardly as at 351 to still another mirror 353 of considerably larger area, which reflects the beam obliquely forwardly and downwardly as at 355 to the viewing screen 45 arranged at a slight tilt or angle on the front of the casing section 47, in a convenient position to be watched easily by the operator.

In passing from the prism 343 to the viewing screen 45, the beam of light passes through the previously mentioned lens 347 and through other lenses indicated in general at 361 and 363. The lens 363, along with other similar lenses of different focal length (one of which is indicated diagrammatically at 363a) are mounted in a turret for selective positioning in the beam of light, in a manner well understood in the field of optical comparators or comparison projectors, in order that different degrees of magnification may be attained as desired. If the turret is provided with six sets of lenses, for example, they may be so designed that by briging one or another of the lenses into the beam of light, various magnifications may be secured of, for example, 10, 20, 31.25, 50, 62.5, and 100 times the size of the original. The turret is indicated schematically at 365, and rotates on the axis 367, parallel to the light path or optical axis 351. The rotation of the turret, to bring any selected set of lenses into the beam of light, is controlled, as usual in optical comparators, by a control knob 369 (Figs. 1 and 2) conveniently located for manual actuation at the front of the machine.

The lenses 347 and 361 image the object in the plane 370, at a point a little beyond the lens 361. This image at 370 is picked up and magnified by the turret lens 363 and projected at the desired magnification onto the screen 45, depending on which turret lens (363, 363a, etc.) has been brought into alinement with the light path 351. The details of design of the lenses themselves, as well as the details of design of the turret and its actuating mechanism, are not part of the present invention, and may be of any known form, as disclosed for example in U.S. Patent No. 2,552,238 of Turner and Kingslake, granted May 8, 1951.

A magnified image of the edge or profile of the template being operated upon, is also thrown on the viewing screen 45, for comparison with the magnified image of the master pattern or reticle. Mounted in stationary position in the lower part of the machine is a ventilated lamp housing 371 containing a second electric lamp 373 located directly below (that is, in vertical alinement with) the file or tool 251 and the first lamp 323. Light from this bulb 373 passes upwardly through a condensing or collimating lens in the mount 375, and through a plane glass plate 377 protecting the lens from filings or chips, and continues upwardly to illuminate the lower face of the template 247 in the vicinity of the file 251.

Light passing from the edge of the template 247, and passing the working edge of the file 251, continues upwardly along the path 381 (Fig. 5) to the mirror 383, is reflected from this mirror along the path 385 to the mirror 387, and is reflected by the latter along the path 389 passing through the prism assembly 343 and directly through the interface 341 thereof, in known manner, and thence along the paths 345, 351, and 355 to the viewing screen 45, in the same manner as the light which came along the path 339 and was reflected at the interface 341. The distance (along the optical path) from the template 247 to the lens 347 is substantially the same as that from the pattern or reticle 305 to the lens 347, so that the pattern will be imaged by the lens 347 in the same image plane as the templet. Thus the image of the edge or outline of the template 247 is thrown on the viewing screen in superimposed relation to the image of the master pattern or reticle 305.

A typical view as seen on the master screen 45 is indicated in Fig. 6, where the line 391 indicates a greatly magnified image of a small part of the inscribed theoretical line on the master pattern or reticle, and the line 393 indicates a corerspondingly magnified part of the profile or silhouette of the template 247 as actually formed at the moment, and the outline 395 indicates the outline or silhouette of the file 251 and a portion of its holding yoke 253, as seen from directly above it. The operator can easily see from the view on the screen that filing of this particular part of the periphery of the template 247 can be continued, as the edge of the template has not yet been filed down to the theoretical outline shown at 391. As filing is continued, the line 393 on the screen will gradually get closer to the line 391, and when the two lines coincide, filing of this part of the template is completed.

All of the mirrors 333, 337, 349 353, 383, and 387 are preferably so-called "first surface" mirrors, for greater optical accuracy and less possibility of distortion of the image, which is particularly important under the rather high magnifications which it may be desirable to use from time to time.

Turning now to what may be called the mechanical details of the optical system, that is, the means for mounting or holding of the parts, the means for focusing, and so forth, reference is now made to Figs. 7–13, although it may be convenient for the reader to keep the schematic view (Fig. 5) before him while dealing with the other figures just mentioned.

Figure 9:
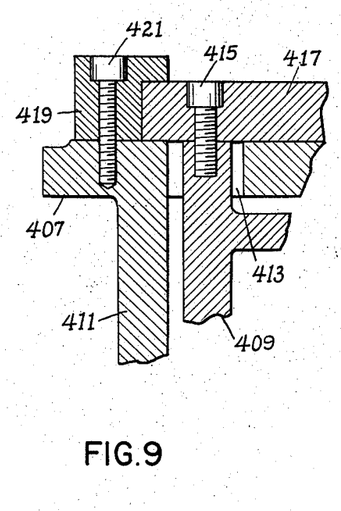
Fig. 9 is a section taken approximately on the line 9—9 of Fig. 8, on a larger scale.
Figure 10:
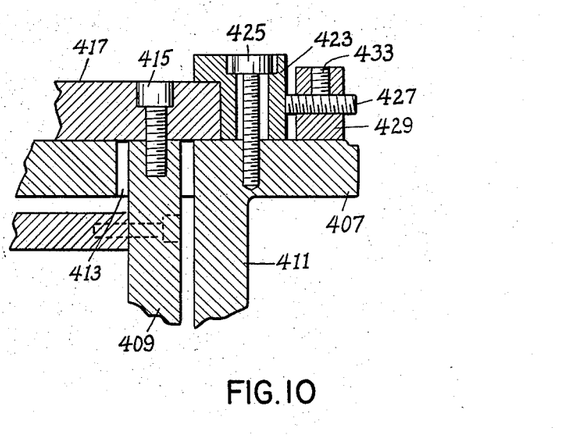
Fig. 10 is a section taken approximately on the line 10—10 of Fig. 8, on a larger scale.

On a vertical front wall portion 401 (Figs. 2 and 7) of the housing 47, there is a fixed supporting member 403, to which is firmly fastened a bracket 405 having a forwardly extending stationary top shelf portion 407 which acts as a support for adjustably mounting a housing or casing indicated in general at 409 and containing the beam-splitting prism and certain of the mirrors. The bracket 405, 407 has two laterally spaced strengthening webs or flanges 411, and the top wall 407 of the bracket is longitudinally slotted (in a front to back direction) at 413, just inside each of these webs 411. The side walls of the prism housing 409 are extended upwardly above the top wall of the housing, through the slots 413, as best seen in Figs. 9 and 10, and are fastened firmly as by means of screws 415 to a slide member in the form of a flat plate 417 which rests on and slides on the flat top surface of the bracket 407. The left edge of the plate 417 is confined by a fixed guideway or gib 419 held in place by screws 421, while the right hand edge of the slide 417 is confined by a similar but adjustable guideway or gib 423 held by holding screws 425 extending through enlarged holes in the gib, and adjusted (when the screws 425 are loosened) by a series of adjusting screws 427 pressing laterally against the outer side face of the gib 423, and threaded through a fixed bar 429 held down to the stationary bracket 407 by screws 431. Setscrews 433 serve to hold the adjusting screws 427 in any position in which they are set. When the screws 425 are slightly loosened, the adjusting screws 427 may be tightened to adjust the gib 423 very accurately against the edge of the slide 417, to allow the member 417 to slide smoothly in the direction of the gibs 419, 423 (front to back of the machine) without any lateral play whatever.

The movement of the plate 417, and of the prism housing 409 carried thereby, is a movement of very small range, serving only for accurate focusing of the image of the master pattern or reticle on the viewing screen. This focusing movement is accomplished by an adjusting knob 435 on a short shaft 437, a smooth part of which is rotatably mounted but held against axial movement in the bracket 439 mounted at the front of the stationary shelf 407, the rear part of the shaft 437 being threaded at 441 to engage with internal threads in a bore 443 extending rearwardly into the front edge of the slide plate 417.

Window openings 451, 453, and 455 (Fig. 7) are formed in the members 417, 407, and the top wall of the housing 409, respectively, in vertical alinement with the upper lamp 323 and with the working edge of the file. The lower one of these windows 455 is closed with a plane glass 457, to keep the housing 409 sealed against entrance of dust. The range of focusing movement of the housing 409 and slide 417 is so slight that in any position of the housing there is no substantial interference with passage of light through the windows 451, 453, and 455, all of which remain sufficiently well alined with each other at all times.

Figure 12:
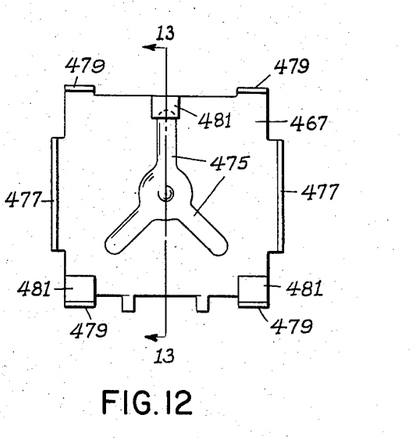
Fig. 12 is an enlarged detail of the mirror backplate shown in Figs. 7 and 11.
Figure 13:
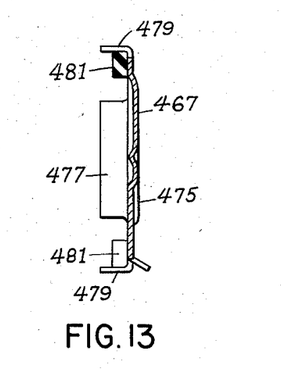
Fig. 13 is a section taken approximately on the line 13—13 of Fig. 12.
Figures 14, 15:
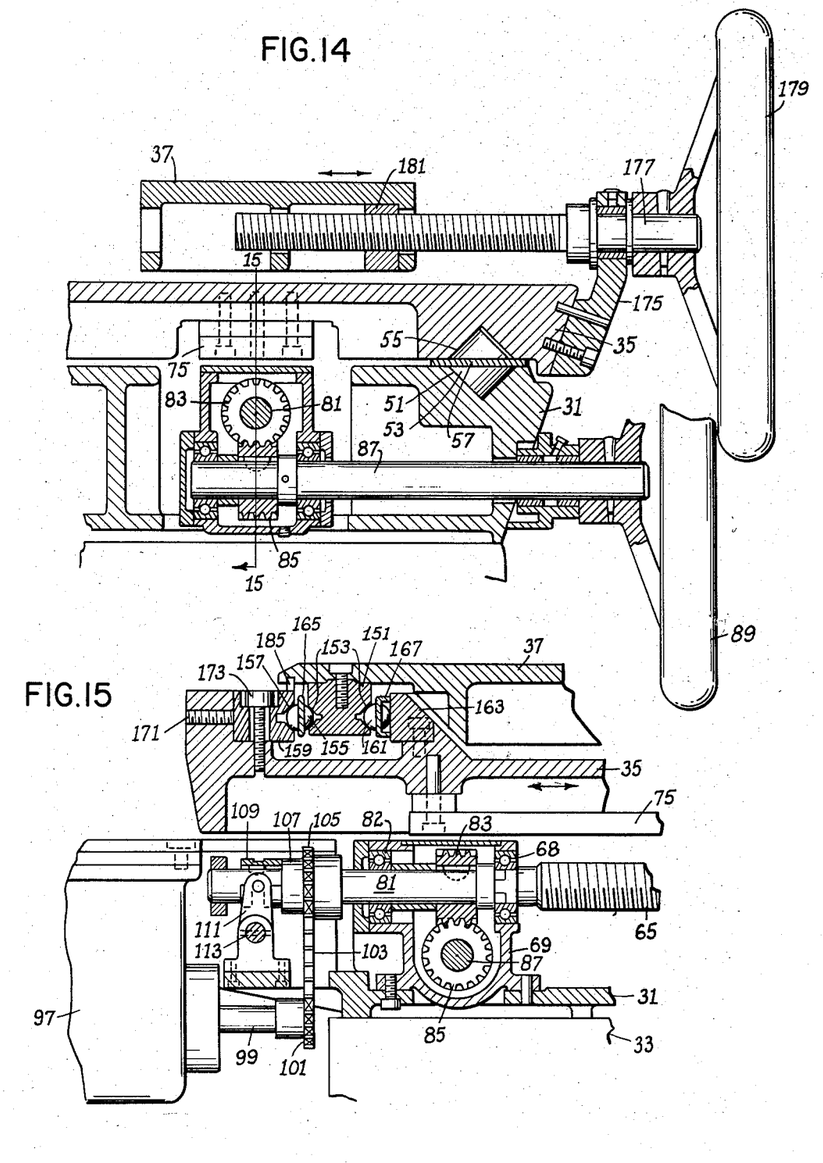
Fig. 14 is a vertical section through fragments of the compound work tables and the feeding means for operating these tables.
Fig. 15 is a vertical section through the tables and operating mechanism, taken in the general region of the line 15—15 of Fig. 14, showing the mechanism near the left hand end of the tables.

The various prism and mirror supports within the housing 409 are preferably all secured to the inner face of the right hand side wall of the housing, which is a separate wall removable from the housing, as indicated in Fig. 10. These supports include a mirror support comprising two laterally spaced side walls 461 connected to each other by rigid cross flanges 463 extending across the housing 409 in such positions as not to interfere with passage of the light rays, as seen in Fig. 7. The edges of the side flanges 461 carry accurately machined surfaces, constituting pads against which the lateral edges of the mirrors 333 and 337 are located, the two mirrors each being held against their respective locating surfaces by similar holding means comprising sheet metal clips 467 pressed toward the back surfaces of the respective mirrors by screws 469 extending through brackets 471 secured to suitable fixed parts of the structure. Each of the metal clips 467 for holding the mirrors 333 and 337, and also those for holding the other mirrors 383 and 387 as further described below, may be of essentially the same construction, as shown in Figs. 12 and 13, comprising a back plate 467 strengthened by pressed ribs 475, the plate having upturned ears 477 at two opposite edges for embracing the front and rear edges of the mirror, and other upturned ears 479 at the other two edges of the plate 467, for embracing the lateral edges of the mirror. Resilient pads 481 of rubber composition or the like are placed at two corners along one edge of the plate 469, and at the central point of the opposite edge, as seen in Figs. 12 and 13, to form a three-point pressure system to press gently against the rear face of the mirror and hold the front face thereof against the locating surfaces.

Figure 11:
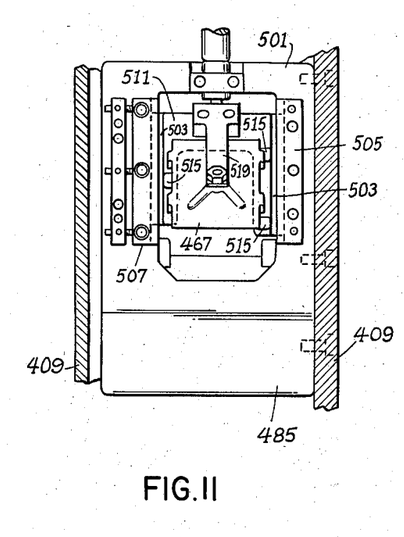
Fig. 11 is a section taken approximately on the line 11—11 of Fig. 7.

Below the mirror supoprt 461, 463 there is a transverse flange 485 fixed to the inner face of the removable right hand side wall of the housing, as already mentioned and as illustrated in Fig. 11. This flange extends across most of the width of the space within the housing 409, and serves as a support for the prism 343 which is pressed downwardly against the top face of the rear part of this flange and forwardly against a vertical locating surface 487 on the flange by means of a pressure shoe 489 reacting obliquely against the upper rear corner of the prism, and pressed against the prism by a screw 491 threaded through a bracket 493 fixed within the housing 409.

The upper front part of the flange 485 is indicated at 501 and has an oblique rear face (at 45 degrees) on which slide the lateral flanges 503 of a mirror carrier 511. These flanges 503 are guided for upward and downward oblique movement between a fixed gib 505 at the right hand edge, and an adjustable gib 507 at the left edge, constructed and adjusted in a manner similar to that described in connection with the fixed gib 419 and adjustable gib 423 in Figs. 8–10, and having adjusting screws of the same kind. Thus the flanges 503 may be very accurately guided in their sliding movements in a manner eliminating all side play or looseness.

These guiding flanges 503 are fixed to, or preferably formed integrally with, a triangular mirror carrier 511 having accurately machined locating surfaces 513 against which the reflecting face of the mirror 383 is pressed, and also having locating surfaces 515 against which the reflecting face of the mirror 387 is pressed, both mirrors being held in position by holding clips 467 of the kind previously described, pressed by screws 469 passing through the brackets 519 secured to the triangular carrier 511.

The mirrors 333 and 337 are set at an angle of 45 degrees to the vertical optical axis. The member 511 which carries the mirrors 383 and 387 has a sliding movement at an angle of 45 degrees to the vertical optical axis, and each of the mirrors 383 and 387 is at an angle of 22½ degrees to the direction of sliding movement of the carrier 511. Therefore, as the beam of light passes upwardly at 381 from the edge of the template 247, it impinges on the reflecting surface of the mirror 383 in a manner to be reflected at an angle of 45 degrees along the path 385 to the mirror 387, where it is again reflected at 45 degrees along the path 389 to the prism 343, entering at the front vertical face of this prism.

The bottom wall of the housing 409 is provided with a window 521 alined with the vertical optical axis, which, like the window 455 in the top wall, is protected by a plane glass 523, to keep the interior of the housing dust tight.

The slide 503 is moved along the guideways 505, 507 by an oblique focusing screw 525 having an accessible knob or finger piece 527 at the front of the machine, a smooth shank portion rotatably mounted in but held against longitudinal movement in the bracket 501, and a lower rear end which is threaded into a tapped opening in the triangular slide 511 so that as the screw is turned, the slide 503 and the mount 511 and the mirrors 383 and 387 carried thereby will be moved along the guideways 505 and 507. This will result in lengthening or shortening the path of travel of the light from the template 247 to the viewing screen 45, so will serve to focus the edge of the template sharply upon the viewing screen.

The focusing adjustment of the knob 527 as well as that of the knob 435 ordinarily need be made only once at the beginning of any given set-up of the machine, and even then the focusing movement is very slight, as the pattern or reticle is always in substantially the same position in the machine, and the template is always in substantially the same position, in a sense longitudinally of the optical path.

The previously mentioned lens 347 is in a lens mounting tube 531 (Fig. 7) which fits snugly in the forward end of the optical tube 533, which at its rear corner carries the mirror 349, pressed against locating surfaces by the same kind of sheet metal clip 467 previously described. The lens 361 is preferably part of the optical tube assembly and is stationarily mounted in a mounting tube 535 in an upward extension at the rear of the optical tube 533.

The rear wall of the housing 409 is, of course, apertured for exit of the beam of light 345 from the prism 343, this aperture being surrounded by an annular collar 541 (Fig. 7) which engages tightly but slidably with a washer or gasket 543 mounted on the stationary wall 405, as shown, so as to exclude dust at this point while allowing the housing 409 to move horizontally forwardly and rearwardly to a limited extent for focusing.

Figure 19:
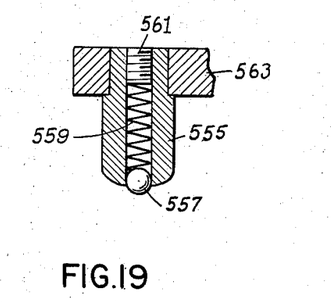
Fig. 19 is a vertical section through the upper work contact member taken approximately on the line 19—19 of Fig. 17.

To support the template so as to prevent chatter thereof due to vertical vibration during the filing operation, there are upper and lower contact fingers for engaging the upper and lower surfaces of the template as close as possible to the file, without interfering with necessary manipulation and with vision of the operator. The lower contact finger 551 (Fig. 17) is preferably in the form of a fixed stud screwed at its lower end into a fixed bracket 553 mounted on a fixed part of the machine a little below and in front of the file 251. The upper contact finger 555 is a resilient finger preferably in the form of a tube (see Fig. 19) having a ball 557 in its bore, pressed downwardly by a coil spring 559, the bottom end of the bore being slightly reduced to prevent the ball from coming completely out of the bore. The upper end of the bore is closed by a screw 561. The upper end of the shank of the tube 555 is screwed into a holder 563 (Figs. 7 and 17) secured to the lower end of a tubular shank 565 slidable obliquely upwardly and downwardly in a bore of a block 567 fixed to the lower inclined portion of the front wall of the optical housing 409. A screw 569 having an accessible knob 571 is held against longitudinal movement in the block 567 and is threaded into the shank 565 so that turning the knob 571 will move the shank 565 upwardly or downwardly to cause the ball 557 at the bottom of the finger 555 to press downwardly on the top surface of the template 247 with whatever degree of pressure is required. A radial pin 573 on the shank 565 rides in a slot 575 in the block 567, preventing the shank 565 from turning when the knob 571 is turned.

It has previously been mentioned that light passing upwardly from the bulb 373 through the lens in the holder 375 (Fig. 17) passes through a plane glass 377 protecting the lens from filings or chips. Any filings or chips that fall on this glass 377 are quickly removed therefrom by a vacuum ring 581 closely surrounding the glass 377 and having several suction inlet openings 583 at intervals around the periphery of the glass and approximately at the level thereof, as well seen in Fig. 17. This vacuum ring 581 is connected by a conduit 585 to any suitable vacuum producing unit 587 is the base of the machine.

Compressed air, supplied from any suitable source thereof, is piped through a supply conduit 591 (Fig. 1) controlled by a valve 593, to a flexible hose 595, issuing from the nozzle 597 thereof which is adjusted to a suitable position near the file 251, to blow filings away from the top face of the template. Any filings which happen to fall downwardly are sucked away so as not to interfere with the optical system, by the vacuum ring 581 as previously mentioned.

If it is desired to use a master pattern or reticle smaller than the full size of the frame 303 (Fig. 3) an adapter plate may, of course, be set in the frame 303, with any desired size of opening in the adapter plate, and the master pattern or reticle itself may be set in the opening of the adapter plate.

If it is desired to scribe a rough outline on the template, to cut it out in the rough on a bandsaw or the like before beginning the final filing operation, this may be done by loosening the screw 255, removing the file yoke 253, and substituting for this yoke a scribing point holder containing a sharp scribing point in the same location as the cutting edge of the file; that is, on the vertical optical axis of the machine. Then the master pattern and the template are placed in proper position, and the work tables are manipulated to carry the template across and in contact with the scribing point, keeping the template outline on the master pattern a short distance away from the location of the scribing point as indicated by a suitable mark (crossed reference lines, for example) on the viewing screen 45. The manipulating movements of the tables will cause the scribing point to scribe a rough outline on the bottom face of the template, which can then be removed temporarily from the machine and roughed out by the use of a bandsaw or other tool. Then the template is replaced in the machine, the scribing point is replaced by the woke 253 and file 251, and the edge of the template is filed down to the final shape desired, determined by watching the projected and enlarged or magnified image of the edge of the template (line 393 in Fig. 6) with relation to the projected and enlarged image of the corresponding part of the master pattern or reticle (the line 391 in Fig. 6). When necessary, the line on the master pattern or reticle can be properly focused on the viewing screen 45 by turning the focusing screw 435. This may somewhat disturb the focus of the template on the viewing screen, but the template can then be brought into proper focus by manipulating the knob 527, which does not affect the focus of the master pattern. Therefore, the master pattern is first focused, and then the template is focused. From time to time as the work progresses, the degree of magnification can be changed, by manipulating the knob 369 to turn the turret having different magnification lenses in it, and the speed of filing can be changed from time to time by manipulating the speed control knob 279.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied without the scope of the appended claims.

What is claimed is:

1. An optical comparator comprising a stationary base, means for holding a tool in a given location adjustable carriage means for holding a work piece in position to be operated upon by said tool, means for holding a reticle in fixed position relative to said work piece to move bodily therewith when said work piece is moved, a viewing screen mounted on said stationary base, means mounted on said stationary base for projecting a magnified image of a silhouette of said tool and of the portion of said work piece adjacent said tool onto said viewing screen, and means mounted on said stationary base for projecting a magnified image of a corresponding portion of said reticle onto said viewing screen in superimposed relation to the image of said tool.

2. An optical comparator comprising a stationary base, means mounted on said stationary base for holding a tool in a given location, adjustable carriage means for holding a work piece in position to be operated upon by said tool, means for holding a reticle in fixed position relative to said work piece to move bodily therewith when said work piece is moved, said reticle being in such position relative to said work piece that an outline on said reticle of the theoretical shape to which said work piece is to be formed will lie directly over and be spaced upwardly from said work piece, a viewing screen mounted on said stationary base, first light beam projecting means mounted on said stationary base directly above said reticle for projecting a first beam of light vertically downwardly to illuminate a portion of said reticle, second light beam projecting means mounted on said stationary base directly below said work piece for projecting a second beam of light vertically upwardly to illuminate a portion of said tool and an adjacent portion of said work piece, first reflecting means mounted on said stationary base between said work piece and said reticle for receiving light from an illuminated portion of said reticle and deflecting such light rearwardly, second reflecting means mounted on said stationary base also located between said work piece and said reticle for receiving light from an illuminated portion of said tool and work piece and deflecting such light rearwardly in position to combine with the rearwardly deflected beam of light from said first reflecting means, and magnifying projecting means mounted on said stationary base for projecting the combined beam of light onto said viewing screen to form thereon a magnified image of the illuminated portion of said reticle in superimposed relation to a magnified image of the illuminated portion of said tool and work piece.

3. A construction as defined in claim 2, further including a carrier mounted on said stationary base and interposed between said reticle and said work piece for supporting both said first reflecting means and said second reflecting means, means for adjusting said carrier bodily in a direction transverse to said first and second beams of light, to adjust simultaneously the positions of said first and second reflecting means, and means for adjusting the position of one of said reflecting means relative to said carrier, to adjust the position of said one of said reflecting means without affecting the position of the other of said reflecting means relative to said first and second beams of light.

4. A construction as defined in claim 2, further including a carrier adjustably mounted on said stationary base and interposed between said reticle and said work piece for supporting both said first reflecting means and said second reflecting means, said carrier being in the form of a hollow body containing said first and second reflecting means within it and being substantially sealed against access of dust.

5. A construction as defined in claim 2, in which one of said reflecting means includes a prism having an oblique interface partially reflecting and partially transmitting light, the deflected beams of light from said first and second reflecting means being combined with each other at said interface.

6. A construction as defined in claim 1, in which said tool is a file arranged substantially vertically, and in which said adjustable carriage means for holding the work piece includes a first carriage movable horizontally relative to said file in a first direction, a second carriage mounted on said first carriage and movable horizontally relative to said first carriage in a second direction substantially at right angles to said first direction, and a third carriage mounted on said second carriage for horizontal rotary movement relative thereto, said work piece being mounted on and carried by said third carriage, and in which said means for holding said reticle includes a bridge member secured to said third carriage and moving bodily therewith and having a horizontal reticle supporting portion for holding said reticle in a horizontal position directly over and spaced upwardly from said work piece.

7. A template filing machine comprising a stationary base, a file holder mounted thereon, a file carried by said file holder and arranged substantially vertically, means for reciprocating said file and holder upwardly and downwardly, a first carriage mounted on said stationary base and movable horizontally relative to said file in a first direction, a second carriage mounted on said first carriage and movable horizontally relative to said first carriage in a second direction substantially at right angles to said first direction, a third carriage mounted on said second carriage for horizontal rotary movement relative thereto, means for holding a work piece in fixed position on said third carriage for bodily movement therewith to present different portions thereof to said file, a bridge member secured to said third carriage in straddling relation to said work piece, said bridge member having a horizontal reticle supporting portion spaced upwardly from said work piece, a reticle supported by said portion in a position directly over said work piece, a viewing screen mounted on the rear of said stationary base above said bridge member, and means for projecting magnified images of portions of said file, said work piece, and said reticle onto said viewing screen.

8. A construction as defined in claim 7, in which said projecting means includes a plurality of optical elements mounted on said stationary base and located in stationary position in the space straddled by said bridge member and remaining stationary when said work piece and reticle simultaneously move at elevations respectively below and above said optical elements.

9. A construction as defined in claim 8, in which said optical elements include a prism having an oblique interface partially transmitting and partially reflecting light, a pair of mirrors for directing light from said reticle onto said interface, and a pair of mirrors for directing light from said file and work piece onto said interface.

10. A construction as defined in claim 7, further including an illuminating lamp located substantially directly beneath said file for projecting a beam of light upwardly to illuminate said file and the adjacent portion of said work piece, a transparent sheet above said lamp to stop downward movement of filings toward said lamp, a vacuum ring surrounding said transparent sheet, said ring having inlet openings in the sides thereof toward said sheet and approximately at the elevation of the top of said sheet, and means for applying vacuum to said ring to suck filings away from said sheet.

11. A template filing machine comprising a file holder, a file carried thereby and arranged substantially vertically, means for reciprocating said file and holder upwardly and downwardly, a first carriage movable horizontally relative to said file in a first direction, a second carriage mounted on said first carriage and movable horizontally relative to said first carriage in a second direction substantially at right angles to said first direction, a third carriage mounted on said second carriage for horizontal rotary movement relative thereto, means for holding a work piece in fixed position on said third carriage for bodily movement therewith to present different portions thereof to said file, a bridge member secured to said third carriage in straddling relation to said work piece, said bridge member having a horizontal reticle supporting portion spaced upwardly from said work piece, a reticle supported by said portion in a position directly over said work piece, a viewing screen, and means for projecting magnified images of portions of said file, said work piece, and said reticle onto said viewing screen, sand means for reciprocating said file upwardly and downwardly including a vertically movable plunger connected to said file holder, means forming a horizontal guideway secured to said plunger, a first rotary member mounted for rotation about a substantially horizontal axis, means for rotating said first rotary member, a second rotary member carried by said first rotary member and mounted for rotation relative thereto about an axis substantially parallel to and offset eccentrically from said axis of rotation of said first rotary member, means for adjustably rotating said second rotary member relative to said first rotary member and for holding said second rotary member fixed in any selected position of adjustment relative to said first rotary member so as to rotate bodily with said first rotary member, and a crank pin mounted on said second rotary member in eccentric relation to the axis on which said second rotary member may be adjustably rotated relative to said first rotary member, said crank pin engaging in said horizontal guideway of said plunger.

12. A template filing machine comprising a stationary base, a file holder mounted thereon, a file carried by said file holder and arranged substantially vertically, means for reciprocating said file and holder upwardly and downwardly, a first carriage mounted on said stationary base and movable horizontally relative to said file in a first direction, a second carriage mounted on said first carriage and movable horizontally relative to said first carriage in a second direction substantially at right angles to said first direction, a third carriage mounted on said second carriage for horizontal rotary movement relative thereto, means for holding a work piece in fixed position on said third carriage for bodily movement therewith to present different portions thereof to said file, a bridge member secured to said third carriage in straddling relation to said work piece, said bridge member having a horizontal reticle supporting portion spaced upwardly from said work piece, and a reticle supported by said portion of said bridge member in a position directly over said work piece.

13. Mechanism for shaping an article to a predetermined outline, said mechanism including a stationary base, a tool for operating upon the article to be shaped, a work holder for holding the article to be shaped, means mounting said work holder on said stationary base for movement relative to said tool to bring various portions of an article carried by said work holder into contact with said tool, a pattern holder for holding a pattern showing an outline to which said article is to be shaped, means for rigidly connecting said pattern holder to said work holder to move in accordance with movements of said work holder relative to said tool, a viewing screen rigidly mounted at the rear of said stationary base, and optical means mounted on said stationary base for projecting onto said viewing screen a magnified image of a portion of said article in proximity to said tool and a magnified image of a corresponding portion of the outline shown by said pattern, said projecting means projecting said images onto said viewing screen in superimposed relation to each other to show simultaneously the actual outline of the portion of the article being operated upon by the tool in superimposed relation to the desired outline thereof as indicated by said pattern.

14. Mechanism for shaping an article to a predetermined outline, said mechanism including a stationary base, a tool for operating upon the article to be shaped, a work holder for holding the article to be shaped, means mounting said work holder on said stationary base for movement relative to said tool to bring various portions of an article carried by said work holder into contact with said tool, a pattern holder for holding a pattern showing an outline to which said article is to be shaped, means for rigidly connecting said pattern holder to said work holder to move in accordance with movements of said work holder relative to said tool, a viewing screen rigidly mounted at the rear of said stationary base, first illuminating means carried by said stationary base for illuminating a portion of said article in proximity to said tool, second illuminating means carried by said stationary base for illuminating a corresponding portion of said pattern, and optical projection means mounted on said stationary base for projecting onto said viewing screen, in superimposed relation to each other, magnified images of the respectively illuminated portions of said article and pattern.

15. Mechanism for shaping an article to a predetermined outline, said mechanism including a stationary base, a tool for operating upon the article to be shaped, a work holder for holding the article to be shaped, means mounting said work holder on said stationary base for movement relative to said tool to bring various portions of an article carried by said work holder into contact with said tool, a pattern holder for holding a pattern showing an outline to which said article is to be shaped, means for rigidly connecting said pattern holder to said work holder to move in accordance with movements of said work holder relative to said tool, a viewing screen mounted at the rear of said stationary base, first illuminating means carried by said stationary base on the side of said article remote from said pattern for illuminating a portion of said article in proximity to said tool, second illuminating means carried by said stationary base on the side of said pattern remote from said article for illuminating a portion of said pattern corresponding to the illuminated portion of said article, and optical projection means mounted on said stationary base for projecting onto said viewing screen, in superimposed relation to each other, magnified images of the respectively illuminated portions of said article and pattern.

16. A construction as defined in claim 15, in which said optical projection means includes reflecting means located between said articles and said pattern for receiving and deflecting light approaching said reflecting means from one direction from said article and from another direction from said pattern.

17. A construction as defined in claim 13, in which said pattern holder is in the form of a bridge connected to said work holder at two spaced points on opposite sides of said article in straddling relation to said article.

18. A construction as defined in claim 13, in which said tool is an abrading element, and further including driving means for moving said abrading element in work-abrading relation to the article carried by said work holder.

19. An optical comparator comprising a stationary base, means carried by said base for holding a tool in a given location, adjustable carriage means mounted on said base for holding a work piece in position to be operated upon by said tool, means for holding a master in fixed position relative to said work piece in vertically spaced relation thereto to move bodily therewith when said work piece is moved, a viewing screen rigidly mounted at the rear of said base, a carrier carried by said base between said work piece and reticle, beam splitter means mounted within said carrier, a first pair of mirrors adjustably mounted within said carrier, first illuminating means for illuminating a portion of said work piece and the adjacent portion of said tool and for producing image rays to be reflected by said first pair of mirrors toward said beam splitter means, a second pair of mirrors mounted within said carrier, second illuminating means carried by said base for illuminating a portion of said master and for producing image rays to be reflected by said second pair of mirrors to said beam splitter means, optical means carried by said base and including a pair of reflecting surfaces for reflecting the pair of image rays emerging from said beam splitter means to said viewing screen to provide an erect image of the illuminated portion of the master on which is superimposed an erect image of the illuminated portion of said work piece and tool, and means for adjusting said carrier transversely of said image rays entering said carrier.

References Cited in the file of this patent

UNITED STATES PATENTS

| | | |
|---|---|---|
| 2,404,770 | Bennett et al. | July 30, 1946 |
| 2,552,280 | Hudak | May 8, 1951 |
| 2,614,368 | Polk et al. | Oct. 21, 1952 |
| 2,765,704 | Mottu | Oct. 9, 1956 |